July 25, 1961
H. G. HOXIE
2,993,285
SCARIFIER ATTACHMENT FOR BULLDOZERS
Filed July 9, 1959
3 Sheets-Sheet 1
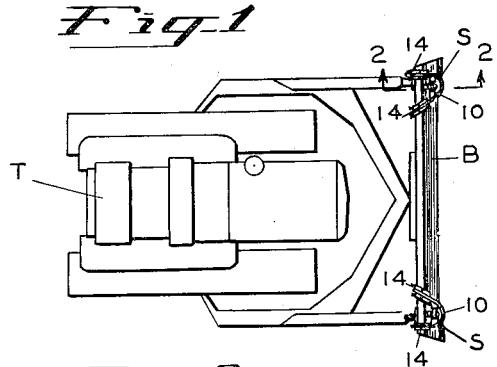
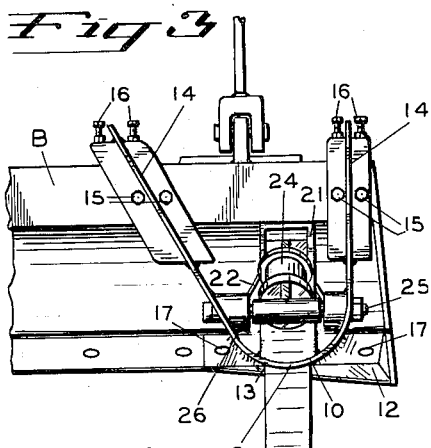
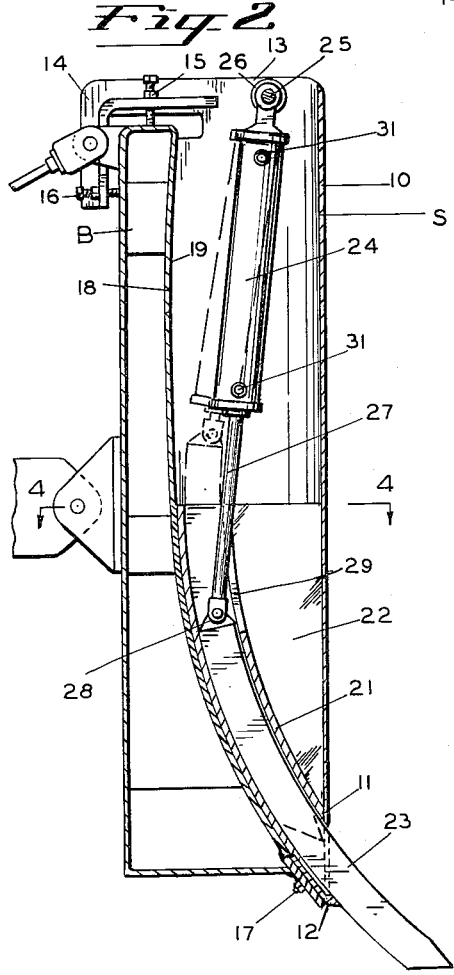
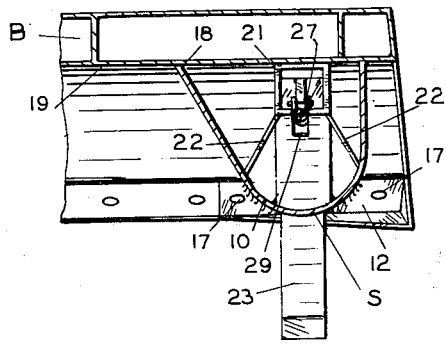
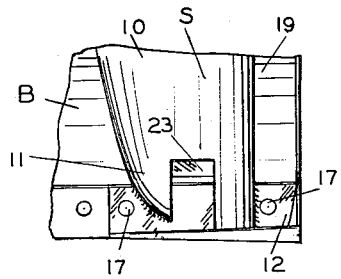
INVENTOR.
HERBERT G. HOXIE
BY
Kimmel & Crowell
ATTORNEYS

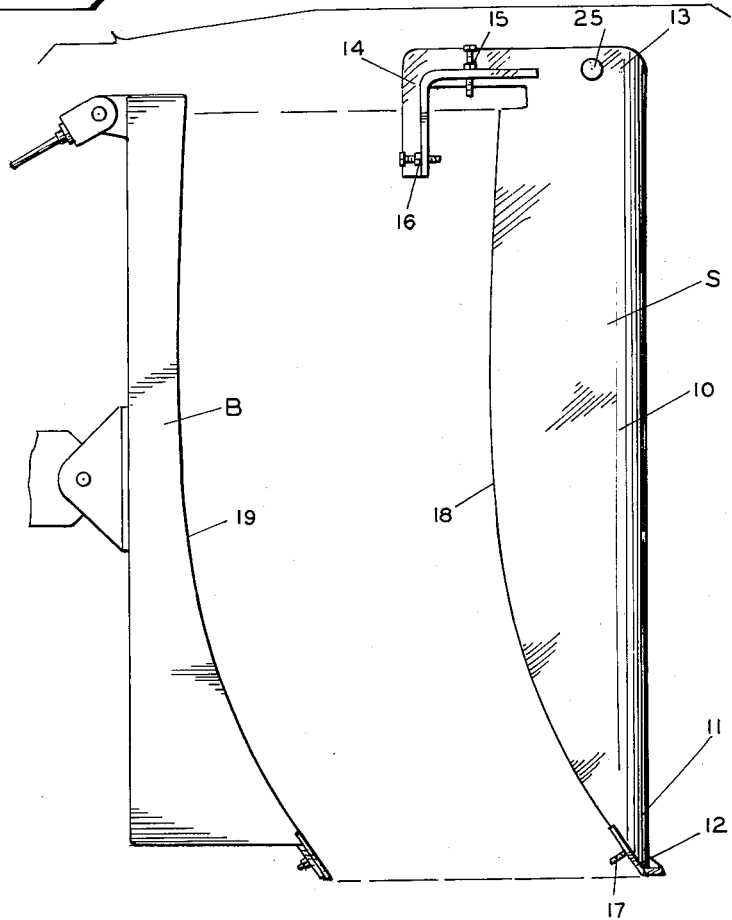

July 25, 1961 H. G. HOXIE 2,993,285
SCARIFIER ATTACHMENT FOR BULLDOZERS
Filed July 9, 1959 3 Sheets-Sheet 3
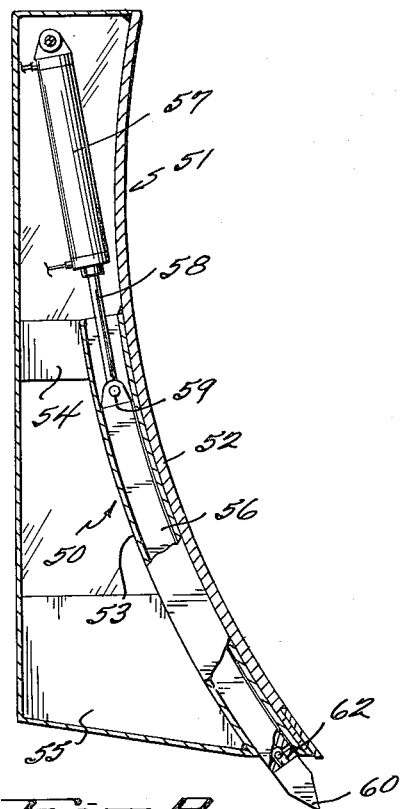
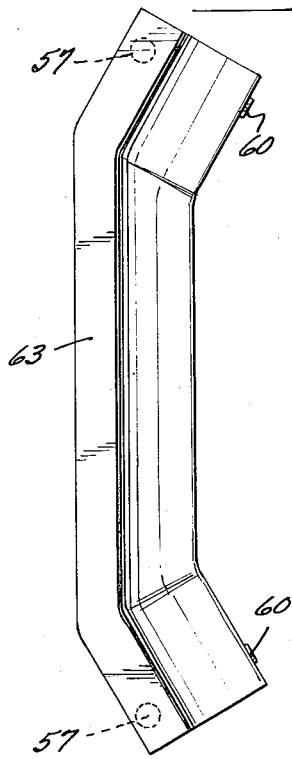
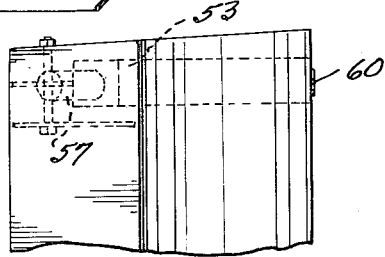
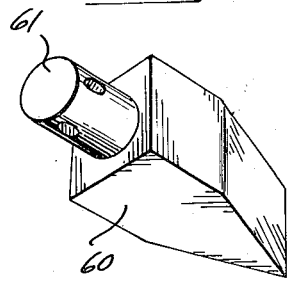
INVENTOR.
HERBERT G. HOXIE
BY
Kimmel & Crowell
ATTORNEYS

United States Patent Office 2,993,285
Patented July 25, 1961

2,993,285
SCARIFIER ATTACHMENT FOR BULLDOZERS
Herbert G. Hoxie, 520 Hansard St., Lebanon, Oreg.
Filed July 9, 1959, Ser. No. 825,906
1 Claim. (Cl. 37—145)

The present invention relates to a scarifier attachment for bulldozers which is adapted to be supported by the bulldozer blade.

The primary object of the invention is to provide a scarifier attachment for bulldozer blades incorporating retractable scarifier teeth to permit the bulldozer to be used selectively for scarifying and for ordinary operations.

Another object of the invention is to provide a scarifier attachment including retractable scarifier teeth in which hydraulic means extend and retract the teeth under the control of the bulldozer operator.

A still further object of the invention is to provide a scarifier attachment for bulldozer blades in which the attachment includes a dirt engaging face for use in moving dirt with the scarifier blades retracted.

Other objects and advantages will become apparent in the following specification when considered in light of the attached drawings, in which:

FIGURE 1 is a top plan view of the invention shown attached to a bulldozer;

FIGURE 2 is an enlarged fragmentary longitudinal vertical section taken along the line 2—2 of FIGURE 1, looking in the direction of the arrows;

FIGURE 3 is a fragmentary top plan view of the structure illustrated in FIGURE 2;

FIGURE 4 is a horizontal fragmentary sectional view taken on line 4—4 of FIGURE 2, looking in the direction of the arrows;

FIGURE 5 is a fragmentary front elevational view of the lower portion of the scarifier attachment;

FIGURE 6 is an exploded fragmentary end elevation of the scarifier attachment and the bulldozer blade;

FIGURE 7 is a sectional view similar to FIGURE 2 of a modified form of the invention;

FIGURE 8 is a fragmentary top plan view of the structure shown in FIGURE 7;

FIGURE 9 is a top plan view of another modified form of the invention; and

FIGURE 10 is a perspective view of one of the renewable tips.

Referring now to the drawings in detail wherein like reference characters indicate like parts throughout the several figures, the reference character S indicates generally a scarifying assembly constructed in accordance with the invention.

The scarifying assembly S is adapted to be mounted on a bulldozer blade B carried in a conventional manner by a tractor T. Each of the scarifying assemblies S includes a vertically disposed U-shaped housing 10 arranged with the convex surface thereof extending forwardly with respect to the bulldozer blade B. The housing 10 has the lower end 11 thereof welded to a conventional detachable corner bit 12 of the type normally detachably secured to the opposite lower forward corners of the bulldozer blade B.

The housing 10 has the upper end 13 thereof provided with a rearwardly extending goose-neck 14 which is adapted to engage over the upper edge of the bulldozer blade B, as is clearly shown in FIGURE 2.

The goose-neck 14 has vertically extending set screws 15 arranged to engage the upper edge of the bulldozer blade B and horizontally extending set screws 16 arranged to engage the rear face of the bulldozer blade B, adjacent the upper end thereof. The corner bits 12 on the lower end 11 of the housing 10 is secured to the lower edge of the bulldozer blade B by means of conventional bolts 17. The housing 10 has the rear edges 18 thereof curved to conform to the shape of the forward surface 19 of the bulldozer blade B providing a rigid support for the assemblies when attached to the blade B in the manner described above.

An arcuate tubular guide 21, having a generally rectangular cross-section, is positioned within the housing 10 and fixedly secured thereto by a pair of forwardly diverging webs 22, which are welded to the guide 21 and to the housing 10, as best illustrated in FIGURE 4. An arcuate scarifier tooth 23 is slidably mounted within the guide 21 and has a generally rectangular horizontal cross-section conforming to the internal shape of the guide 21. A hydraulic ram 24 is arranged in overlying relation to the tooth 23 and has its upper end carried by a cross shaft 25 journalled in bearings 26 carried by the upper end of the housing 10.

A piston rod 27 depends from the ram 24 and is connected to the upper end of the tooth 23 by a pivot pin 28. The guide 21 has a vertical slot 29 formed in the center of the forward face thereof to permit the piston rod 27 to reciprocate within the upper end of the guide 21 without binding thereagainst. The tooth 23 is illustrated in its extended position in full lines in FIGURE 2 with the retracted position thereof indicated in broken lines.

A hose connection 31 on the ram 24 permits conventional hydraulic hoses (not shown) to be connected between the ram 24 and a source of controlled hydraulic fluid on the tractor T.

In the use and operation of the scarifier assembly S, the bulldozer blade B can be used in its normal manner when the scarifying teeth 23 are in raised or retracted position. The housings 10 of the scarifying assembly S act as closures to each end of the bulldozer blade B converting the blade B into a U-shaped type which is capable of moving considerably more material than is normally possible with a conventional bulldozer blade.

When it is desirable to scarify the ground surface, such as moving of rocks and the like, the teeth 23 are lowered by action of the rams 24 to the position shown in FIGURE 2 so that a scarifying tooth 23 extends below the bulldozer blade B at each end thereof.

Obviously, with the attachment illustrated herein, the bulldozer blade B can be alternately used for scarifying and for moving dirt loosened by the scarifying operation without involving material delays while the equipment is converted from one use to the other.

In FIGURES 7 through 10, a modified form of the invention is illustrated, wherein a scarifier assembly, indicated generally at 50, is mounted in the bulldozer blade, generally indicated at 51, rearwardly of the arcuate scraping face 52 thereof.

An arcuate tubular guide 53 is secured to the rear face of the scraper blade 52 and is supported by brace members 54, 55 at the upper and lower respective ends thereof. An arcuate scarifier tooth 56 is slidably mounted in the arcuate guide 53 and is arranged to project below the bulldozer blade 51, as is seen in FIGURE 7.

A hydraulic ram 57 is mounted in the bulldozer blade 51 above the arcuate guide 53 and has a piston rod 58 projecting downwardly therefrom into the arcuate guide 53. The piston rod 58 has its lower end secured to the upper end of the scarifier tooth 56 by a pivot pin 59.

A replaceable tip 60 is provided for the lower end of the tooth 56 and includes a shaft 61 extending upwardly therefrom which is secured in a socket 62 in the lower end of the tooth 56.

In FIGURE 9 a U-shaped type bulldozer blade 63 is illustrated with the invention applied to each end thereof.

Having thus described the preferred embodiments of the invention, it should be understood that numerous

What is claimed is:

In combination with a bulldozer blade having an upper end edge, a lower end edge, spaced ends connecting the adjacent ends of said end edges together, an arcuately curved front face disposed with the concave face facing forwardly, of a scarifier comprising an upstanding arcuately curved housing of U-shaped cross-sectional configuration disposed adjacent at least one of the ends of said blade with the free ends of the legs thereof abutting said concave face of said bulldozer blade and with the bight thereof forwardly of and spaced from said blade front face, the free ends of the legs of said housing being conformably shaped to fit and being secured to said blade front face, means on the upper end of said housing detachably securing said housing to the upper end edge of said bulldozer blade, means on the lower end of said housing detachably securing the lower end of said housing to the lower end edge of said blade, an upstanding arcuately curved scarifying tooth conformably shaped to said housing mounted for sliding movement in said housing from an extended position projecting from below the lower end of said housing to a retracted position wholly within said housing, and power means in said housing for extending and retracting said tooth.

References Cited in the file of this patent

UNITED STATES PATENTS

| | | |
|---|---|---|
| 2,042,196 | Senz | May 26, 1936 |
| 2,297,677 | Forte | Oct. 6, 1942 |
| 2,446,074 | Blackmore | July 27, 1948 |
| 2,497,351 | Fletcher | Feb. 14, 1950 |
| 2,899,760 | Armington | Aug. 18, 1959 |